United States Patent
Nguyen et al.

(10) Patent No.: US 9,971,474 B2
(45) Date of Patent: May 15, 2018

(54) GUI INTEGRATED REQUEST FOR ENHANCEMENT

(71) Applicant: Dell Products, LP, Round Rock, TX (US)

(72) Inventors: Giang L. Nguyen, Lowell, MA (US); Carlos Reyes, Nashua, NH (US)

(73) Assignee: Dell Products, LP, Round Rock, TX (US)

( * ) Notice: Subject to any disclaimer, the term of this patent is extended or adjusted under 35 U.S.C. 154(b) by 452 days.

(21) Appl. No.: 14/265,451

(22) Filed: Apr. 30, 2014

(65) Prior Publication Data
US 2015/0317039 A1    Nov. 5, 2015

(51) Int. Cl.
| G06Q 10/06 | (2012.01) |
| G06F 3/0482 | (2013.01) |
| G06F 3/0484 | (2013.01) |
| G06F 17/30 | (2006.01) |
| G06Q 30/00 | (2012.01) |

(52) U.S. Cl.
CPC ........ *G06F 3/0482* (2013.01); *G06F 3/04842* (2013.01); *G06F 17/3089* (2013.01); *G06Q 10/0633* (2013.01); *G06Q 30/016* (2013.01)

(58) Field of Classification Search
CPC ........ G06F 3/048; G06F 15/16; G06F 9/4443; G06F 11/3055; G06Q 10/0633; G06Q 10/06316; G06Q 10/063; G06Q 10/063114
See application file for complete search history.

(56) References Cited

U.S. PATENT DOCUMENTS

| 5,537,618 | A | * | 7/1996 | Boulton | G06F 11/3055 |
| | | | | | 434/118 |
| 6,865,713 | B1 | * | 3/2005 | Bates | G06F 17/30905 |
| | | | | | 707/E17.121 |
| 2003/0126001 | A1 | * | 7/2003 | Northcutt | G06Q 10/04 |
| | | | | | 705/7.15 |
| 2005/0278386 | A1 | * | 12/2005 | Kelly | G06F 17/30241 |
| 2007/0297337 | A1 | * | 12/2007 | Beygelzimer | G06Q 10/0639 |
| | | | | | 370/241 |
| 2008/0209328 | A1 | * | 8/2008 | Parkinson | G06F 9/4443 |
| | | | | | 715/733 |
| 2008/0288271 | A1 | * | 11/2008 | Faust | G06Q 30/02 |
| | | | | | 705/7.32 |
| 2009/0064200 | A1 | * | 3/2009 | Walter | G06F 9/4443 |
| | | | | | 719/328 |
| 2009/0217196 | A1 | * | 8/2009 | Neff | G06Q 10/10 |
| | | | | | 715/799 |

(Continued)

*Primary Examiner* — Ryan Pitaro
(74) *Attorney, Agent, or Firm* — Hamilton, Brook, Smith & Reynolds, P.C.

(57) ABSTRACT

A computer-assisted method of receiving request for enhancement (RFE) information includes providing, in a product, a graphical user interface (GUI) configured to present to the user one or more inputs for submitting RFE information. The method further includes conveying, by a first processor associated with the product, the RFE information the user submits to the one or more inputs, the RFE information being tagged with an identifier associating the RFE information with the product. The method also includes receiving, by a second processor, the RFE information and the associated identifier, and providing the RFE information and the associated identifier to a service team associated with the product.

18 Claims, 4 Drawing Sheets

(56) References Cited

U.S. PATENT DOCUMENTS

| | | | |
|---|---|---|---|
| 2011/0029883 A1* | 2/2011 | Lussier | G11B 27/034 715/738 |
| 2011/0066559 A1* | 3/2011 | White | G06Q 10/00 705/304 |
| 2012/0124482 A1* | 5/2012 | Ray | G06Q 50/00 715/751 |
| 2013/0212583 A1* | 8/2013 | Gordon | G06F 9/44 718/100 |
| 2014/0123056 A1* | 5/2014 | Puranik | G06F 3/048 715/780 |
| 2014/0289160 A1* | 9/2014 | Stovall | G06Q 30/0282 705/347 |
| 2016/0247163 A1* | 8/2016 | Donsky | G06Q 10/06 |

\* cited by examiner

GUI INTEGRATED REQUEST FOR ENHANCEMENT

BACKGROUND OF THE INVENTION

The proliferation of mobile computing platforms, such as laptop computers, tablets and smartphones, has led to the widespread use of software products for many diverse applications. These software products are being used by members of a mainstream population, many of whom are technically unsophisticated. To accommodate such a demographic, the user's connection to the software product is often through a simple and user-friendly graphical user interface (GUI).

While using a software product, a user may think of a change that would improve the product. Such ideas often may be insignificant and unhelpful, but occasionally a user may hit on a brilliant idea that could substantially improve the product.

Recognizing that good ideas may come from any of their users, software product developers may seek to develop ways to harvesting such ideas. One way to do so is to provide a toll-free "help" or "suggestion" telephone number the user may call, or website URL the user may visit, to ask questions or provide input.

FIG. 1 illustrates an example of such a technique for gathering ideas. This example demonstrates that multiple tools, many of which may be redundant and inconsistent with one another, come into play to process a user's idea.

A user 102 working with a software product thinks of an idea (referred to herein as a Request For Enhancement; RFE) for improving the product. The user contacts a call center 104 associated with the product vendor, either via a phone call to a phone number (provided, e.g., by the software or associated online or hardcopy documentation), or through a computer-based link (e.g., a chat session or email).

An agent at the call center 104 provides an initial vendor point of contact for the user 102. The agent at the call center 104 conveys the user's RFE information to a first support group, referred to here as Level 1 ("L1") Support 106. A member of L1 Support documents the information from the call center agent by opening a case using the Delta Case Management tool 108.

The case is then escalated to Level 2 ("L2") Support 110. The Level 2 Support 110 personnel use a "Salesforce" tool 112. So although access to the Delta Case Management tool 108 is still available, the Salesforce tool 112 is preferred at the L2 level.

When the case is subsequently escalated to Level 3 ("L3") support 114, an L3 agent opens a Product Support Escalation ("PSE") within Agile 116, a Product Quality Management ("PQM") tool.

The L3 agent next escalates the user RFE to International Product Support ("IPS"), which uses two different tools to process the RFE. IPS opens a "Bug" 118 in the Bugzilla tool 120, and opens a Marketing Requirement Document ("MRD") 122 in another tool 124. The term "Bug" is specific to the Bugzilla tool, and is essentially an entry or record introduced to the tool.

Finally, the Marketing and Development group evaluates 126 the RFE and considers whether or not the user-submitted idea in the RFE should be accepted. Note that at this point in the example, there are five tools in play with respect to the user's RFE: Delta Case Management 108, Salesforce 112, Agile 116, Bugzilla 120 and the MRD tool 124. As the RFE information is transferred across support group boundaries and into different management/analysis tools, there is an opportunity for the RFE data to be corrupted or lost.

Once the user submits the RFE information into this exemplary system, there may be little or no feedback to the user regarding the status of the RFE. If the user contacts the call center 104 again to ask for status, the user may be frustrated for a number of reasons. First, the call center agent may have no access to the higher layer support entities. Second, this exemplary system does not provide an ability to track or otherwise determine where the RFE is in the system, so the call center agent does not know where to look even if the agent has access to the higher layers. Further, with so many different management/analysis tools supporting the RFE, it may be difficult for the call center agent to determine exactly where to look for the most relevant and current information.

SUMMARY OF THE INVENTION

The described embodiments provide for efficient processing of user Request For Enhancement (RFE) information by integrating RFE gathering functionality directly into the software product to which the RFE applies. The described embodiments include a Graphical User Interface (GUI) with an input feature that may allow a user to submit the RFE information. RFE information submitted through the GUI may be context sensitive. In one aspect, context sensitive RFE information is tagged or otherwise associated with information identifying the software product and/or other information associated with the user.

In one aspect, the described embodiments are a computer-assisted method of receiving request for enhancement (RFE) information. The method includes providing, in a product, a graphical user interface (GUI) configured to present to the user one or more inputs for submitting RFE information. The method also includes conveying, by a first processor associated with the product, the RFE information the user submits to an RFE evaluating facility. The RFE information is tagged with an identifier associating the RFE information with the product. The method also includes receiving, by a second processor at the RFE evaluating facility, the RFE information and the associated identifier. The method further includes providing the RFE information and the associated identifier to a service team associated with the product.

In one embodiment, the product is a software product running on a computing platform. In another embodiment, the GUI presents a link to the user that when selected directs the user to a webpage configured to provide the one or more inputs for submitting RFE information. In another embodiment, the webpage includes content related to the product. In yet another embodiment the webpage includes one or more categories available to be selected by the user. The one or more categories are configured to facilitate input of the RFE information. In another embodiment, the webpage includes a plaintext field configured to accept a textual composition from the user.

One embodiment includes storing in a storage medium, by the second processor, the received RFE information and the associated identifier. In another embodiment, the memory is a database or is related to or associated with a database.

In one embodiment, the identifier further includes user information that associates the RFE information with the user. The user information that associates the RFE information with the user may include one or more of user name, user address, user phone number and user email address. In another embodiment, the one or more inputs for submitting RFE information includes an online form having one or more fields for entering data.

In one embodiment, the one or more fields are associated with prompts configured to instruct the user about the data to be entered into the one or more fields. Another embodiment further includes providing feedback information concerning the RFE to the user.

In another aspect, the described embodiments are a tangible, non-transitory, computer readable medium for storing computer executable instructions for handling a request for enhancement (RFE), with the computer executable instructions for receiving RFE information submitted from a remote user. The RFE information is tagged with an identifier associating the RFE information with a product. The computer readable medium further includes instructions for providing the RFE information and the associated identifier to a service team associated with the product.

In one embodiment, the computer readable medium includes instructions for storing in a storage medium the received RFE information and the associated identifier. The memory may be a database, may be related to or may be associated with a database. In another embodiment the computer readable medium includes instructions for providing feedback information concerning the RFE to the user.

In another aspect, the described embodiments are a tangible, non-transitory, computer readable medium for storing computer executable instructions for submitting a request for enhancement (RFE), with the computer executable instructions for providing, in a product, a graphical user interface (GUI) configured to present to the user one or more inputs for submitting RFE information. The computer readable medium further includes instructions for conveying, by a first processor associated with the product, the RFE information the user submits to the one or more inputs. The RFE information is tagged with an identifier associating the RFE information with the product.

In an embodiment, the computer readable medium further includes instructions for presenting a link to the user that when selected directs the user to a webpage configured to provide the one or more inputs for submitting RFE information. In another embodiment, the computer readable medium further includes instructions for providing one or more categories available to be selected by the user, the one or more categories configured to facilitate input of the RFE information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 2:
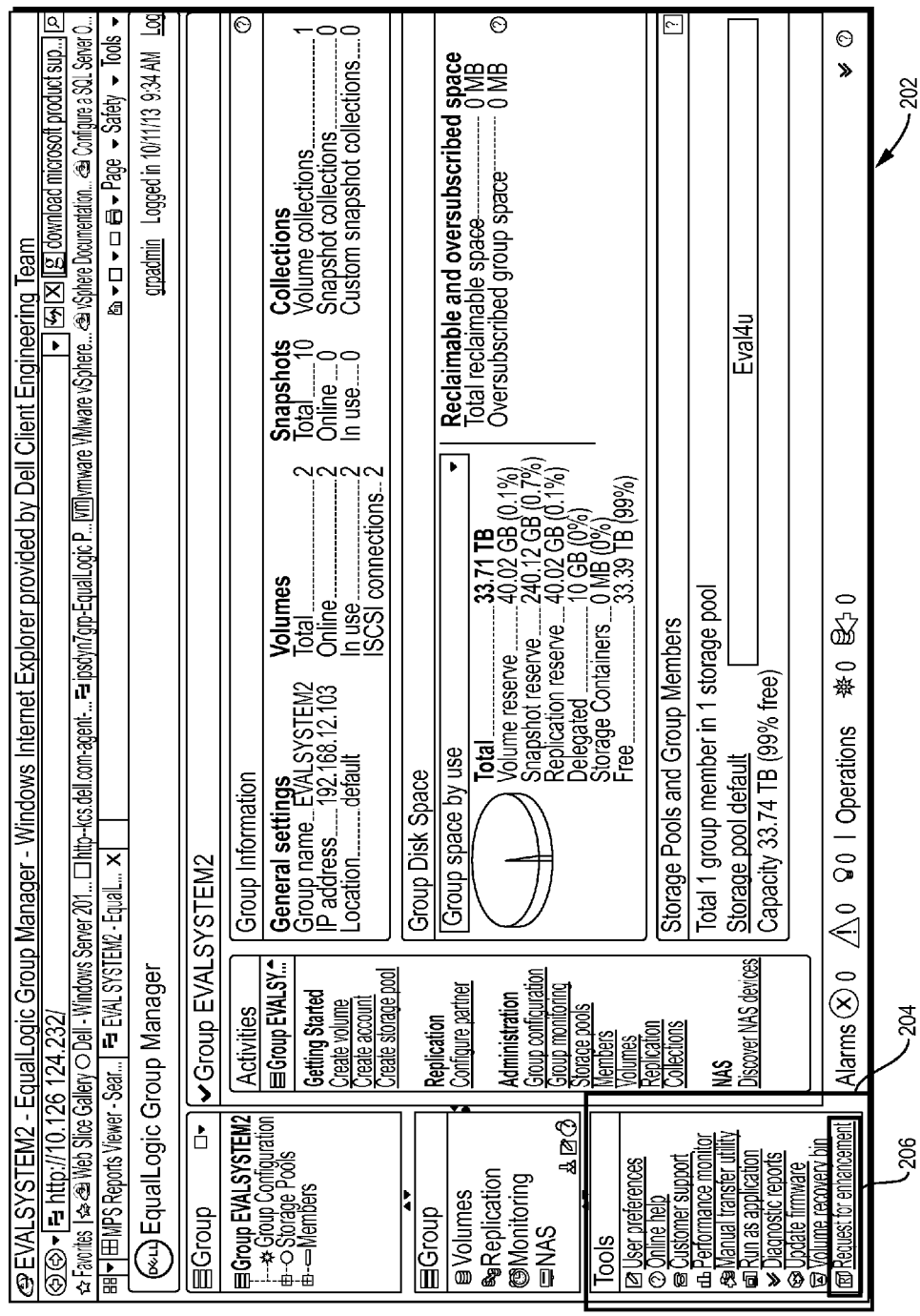
FIG. 2 shows an example of a Graphical User Interface (GUI) for submitting Requests for Enhancement (RFEs) according to the described embodiments.

The described embodiments modify a software product to facilitate user input for improving the software product, referred to herein as a "request for enhancement" (RFE). An example embodiment revises an existing graphical user interface (GUI) to provide an avenue for user input or communication to the software product vendor. FIG. 2 shows an example GUI 202 for a Dell EqualLogic Group Manager product. The GUI 202 includes a "tools" area 204 that provides the user with a number of active links to various services such as user preferences, online help and customer support. Some of the described embodiments, the example embodiment included, provide another link, "request for enhancement" (RFE) 206. Other embodiments may include a different mechanism for selecting the RFE feature within the GUI, such as an icon, a button, or a check box.

The mechanism for selecting the RFE feature 206 within the GUI is context sensitive, meaning that when the user selects the RFE feature 206 in the context of a particular product, the user is directed to a data entry mechanism that is specific to the particular product.

In the example embodiment, selecting the RFE link 206 directs the browser associated with the software product to a webpage that is specific to the software product (the Dell EqualLogic Group Manage product in the described example). In other embodiments, selecting the online link directs the user to an online form that has one or more fields for entering data. This online form may be instantiated within the software product GUI, or it may be instantiated in a separate window of the computing platform's display.

The webpage of the example embodiment includes one or more data collection facilities, such as data-specific fields (e.g., name, address, phone number, email address), multiple choice questions, open ended questions, drop-down menus, essay-type text boxes, and other similar techniques for data input and for prompting or eliciting user descriptions and/or comments.

Each of the data-specific fields may include one or more prompts that assist and direct the user as to how the field should be completed. For example, the "name" field may be associated with a prompt that reads, "Please enter your name here."

The webpage may also be arranged according to categories configured to facilitate input of the RFE information. For example, the webpage may be divided into "hardware" and "software" as top level categories. The hardware category may be subdivided into "chassis," "controller," "hard drive," "SSD," and "power supply." The software category may be subdivided into "new feature," "existing features," and "management," as follows:

New feature
    Text field that allows the user to describe the new feature in his/her own words
Existing features
    Volume ACL
    Snapshot
    Clone
    Replication
    Manual replication Volume Collection
Schedule
Volume recovery
Sync Rep
Volume binding
Space balancing
Management
Web GUI
Command line
SSH
Telnet
FTP
Monitoring Using one or a combination of the data collection facilities described herein, the user enters the RFE information into the webpage. The webpage receives and arranges the entered RFE information into a format suitable for storage, and saves the data into a tangible, non-transitory, computer-readable storage medium. The storage medium may be volatile or non-volatile and may include, for example, flash memories, dynamic memories, removable disks, and non-removable disks. The storage medium may be associated with a database function, which facilitates efficient storage, searching and retrieval of the RFE data.

The information saved in the storage medium may be tagged or otherwise associated with an identifier that specifies the product with which the saved information applies. The associated identifier may be a product identification number or information explicitly describing the product. The identifier is also saved in the storage medium.

The information saved in the storage medium may be tagged or otherwise associated with information that identifies the user who submitted the RFE information. This identifying information may include the user's name, the user's address, phone number and/or email address. This identifying information is also saved in the storage medium.

The described embodiments may provide at least some form of feedback information to the user regarding status of the user's RFE submission. For example, one embodiment may periodically provide status emails to the user, triggered by time intervals (e.g., emails sent once every two weeks) or triggered by events (e.g., email sent each time the RFE is processed in some way). Another embodiment may provide the user with a status website to visit, so that the user can view the RFE status as a dashboard or other display format at any time. Some embodiments may allow a user to submit questions or comments during the RFE evaluation process and/or in response to status updates, so that the user can be a contributor to the process.

Figure 3:
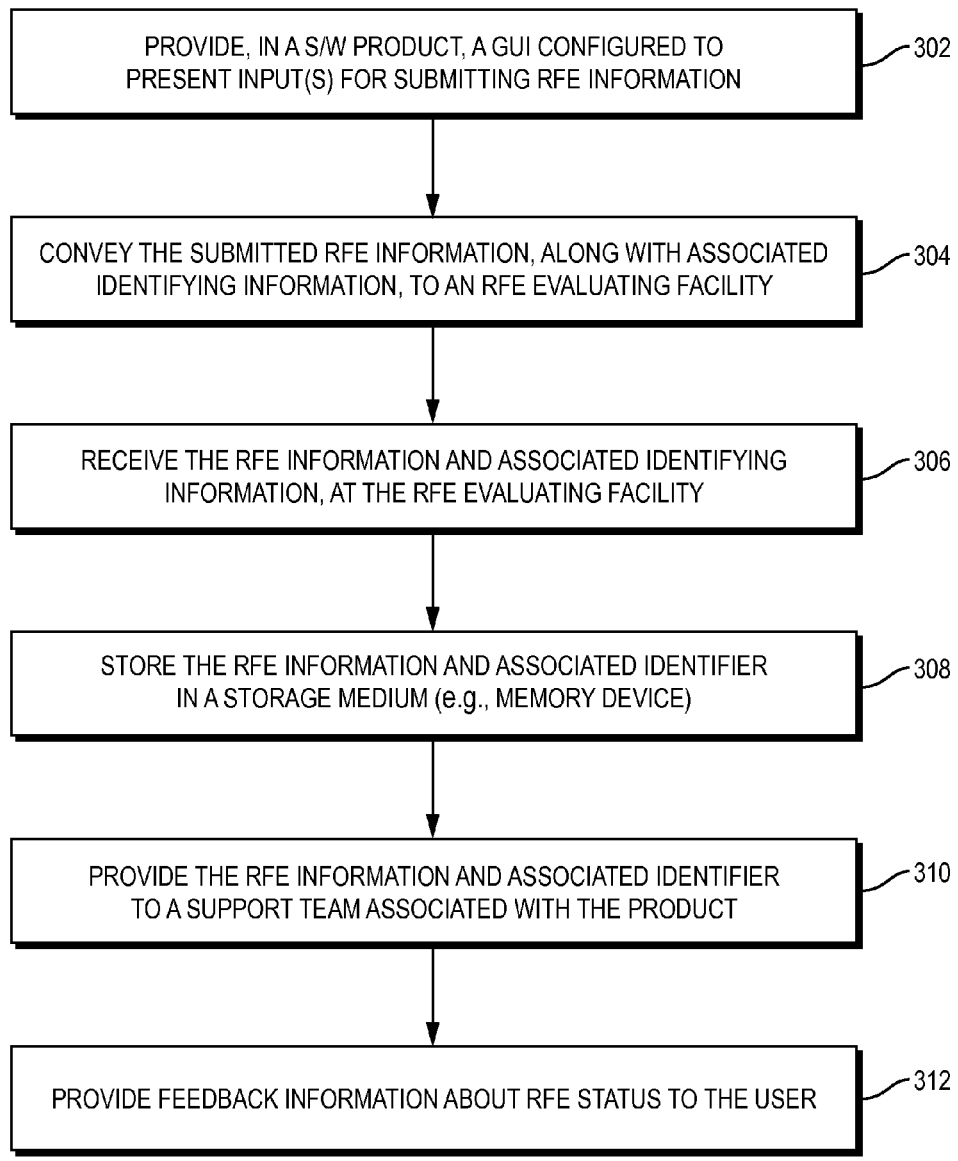
FIG. 3 illustrates a computer method and/or system for receiving and evaluating RFE information according to the described embodiments.

FIG. 3 illustrates a computer method and/or software assembly 300 that implements a procedure for receiving and evaluating RFE information according to the described embodiments. The procedure (generally method/assembly 300) provides 302, within a software product, a GUI that is configured to present one or more inputs to the user for submitting RFE information. In response to operation of the GUI, step or module 304 conveys the submitted RFE information, together with associated identifying information, to an RFE evaluating facility. Conveying the RFE information may utilize various network and other electronic communication techniques, along with associated physical components, protocols and/or media. The evaluating facility receives 306 the RFE information. At the evaluating facility, a support team familiar with the product can evaluate and potentially act on the RFE. Module/step 306 may sort the received RFEs by associated product identifiers or other associated information. The RFE information and related data may be stored 308 in a storage medium, such as a database 412 of FIG. 4, described below. The RFE information, together with the associated user identifier information and product identifier, is assigned or otherwise provided 310 to the pertinent support team for evaluation. Once the RFE information is evaluated, feedback is provided 312 to the submitting user by any of several methods, as described herein.

During the RFE evaluation process, the stored RFE information may be readily accessible (indexed, for instance, by product identifier) by various company representatives. For example, sales personnel may access and evaluate the RFE information to determine its potential for enhancing the product's appeal to customers and consequently increasing sales. Design engineers may access and evaluate the relative difficulties associated with implementation of the idea. Design engineers may also search by product identifier to find common areas of suggested improvement for the product. This may help to prioritize areas in need of improvement for the product.

Figure 1:
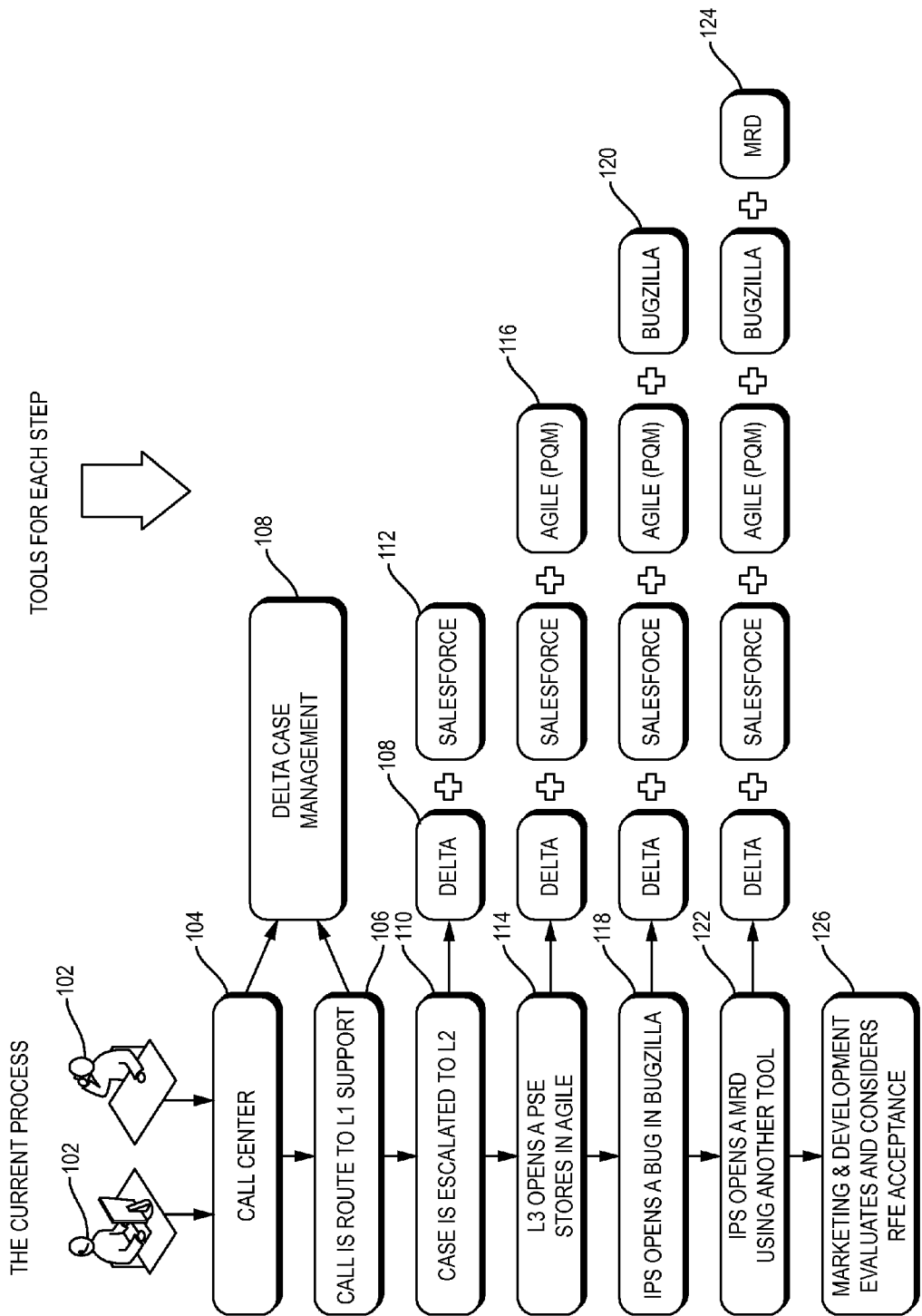
FIG. 1 illustrates an example of a technique for gathering ideas.

The customer support personnel can access the RFE to monitor its evaluation process in order to keep the RFE submitter in the evaluation loop. Each of the foregoing (and potentially other) company representatives may store his comments in the database record of the RFE. When the customer support personnel field follow-up calls from the RFE submitter, relevant information is efficiently accessed from the database by user identifier indexes and other associated information. The database record serves as a central location or point of access of each representative's (sales department, design engineer, etc.) comments and notes, unlike the disparate locations and systems of the prior art of FIG. 1.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Figure 4:
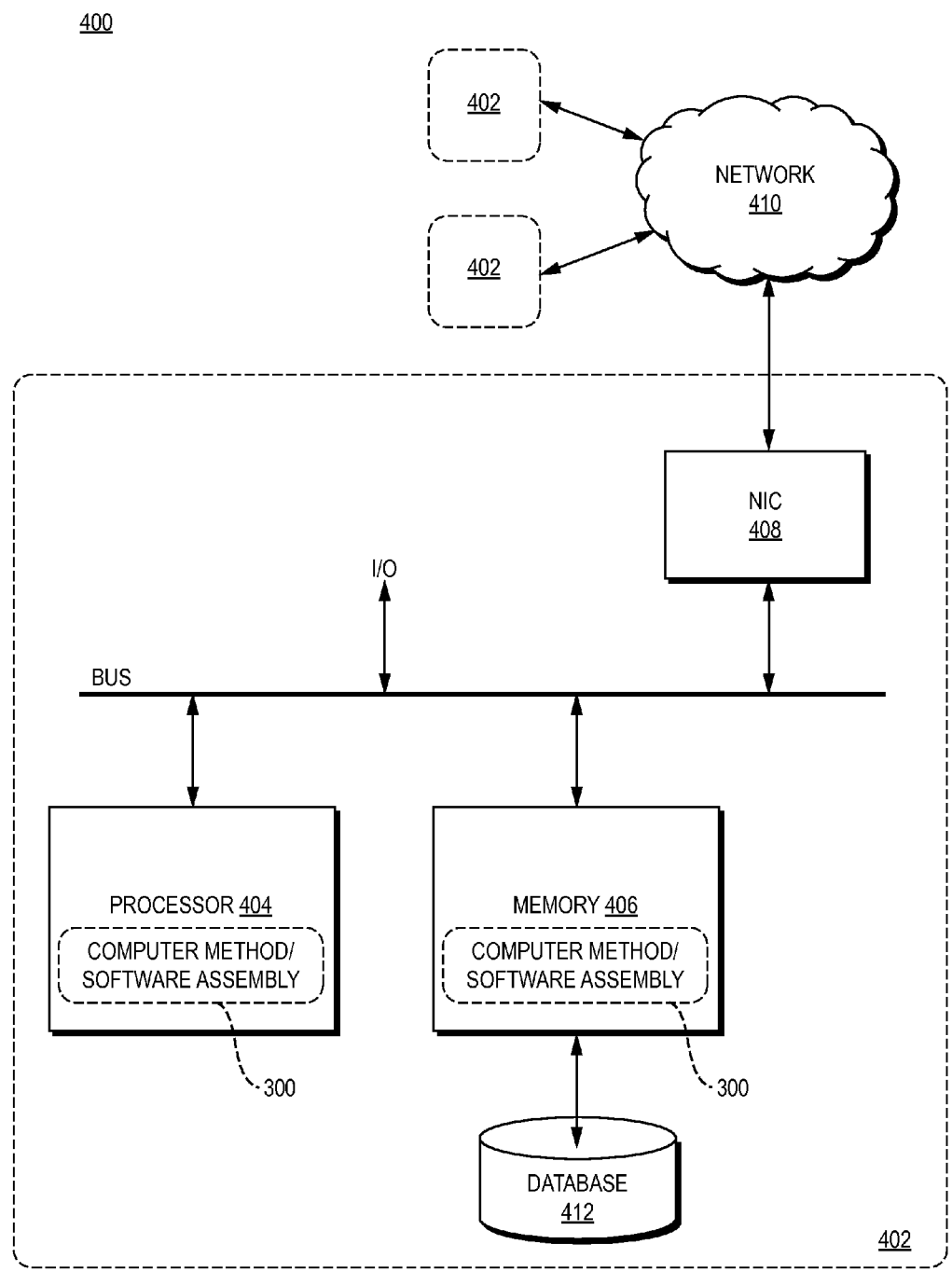
FIG. 4 is a block diagram of a computer network embodying the present invention.

Illustrated in FIG. 4 is an example computer network 400 with computer nodes 402 embodying the present invention. Each node 402 has a processor 404 (e.g., CPU), a memory 406, and a network interface circuit (NIC) 408, among other components such as user I/O, power distribution and data interconnection. The NIC 408 provides interface communication services (e.g., hardware and protocol stack) to allow the node 402 to communicate with other nodes and devices through the network. The processor 404 and memory 406 carry out instructions implementing the method 300 of FIG. 3 detailed above. The memory 406 may be associated with a database 412 for organizing the RFE information (including submitter/user identifiers, product identifiers and the like) and facilitating efficient access to that information.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-assisted method of receiving request for enhancement (RFE) information, comprising:
    providing, in a particular product, a graphical user interface (GUI) configured to present to the user one or more inputs for submitting RFE information, the inputs being specific to the particular product;
    conveying, by a first processor associated with the product, the RFE information the user submits to an RFE evaluating facility, the RFE information being tagged, by the first processor, with an identifier associating the RFE information with the product;
    receiving, by a second processor at the RFE evaluating facility, the RFE information and the associated identifier, the receiving storing the RFE information and the associated identifier in memory structured to enable centralized access;
    processing, including providing feedback information, by multiple departments associated with the particular product concerning evaluation of the RFE information, centrally storing the feedback information in the structured memory;
    responsively sending evaluation status of the RFE information to the user, the sending including periodically providing status communications to the user, the sending triggered by at least one of (i) time intervals and (ii) events based upon RFE processing, the evaluation status being generated by monitoring the evaluation process across the multiple departments to determine any processing by any of the multiple departments concerning evaluation of the RFE information.

2. The computer-assisted method of claim 1, wherein the product is a software product running on a computing platform.

3. The computer-assisted method of claim 1, wherein the GUI presents a link to the user that when selected directs the user to a webpage configured to provide the one or more inputs for submitting the RFE information.

4. The computer-assisted method of claim 3, wherein the webpage includes content related to the product.

5. The computer-assisted method of claim 3, wherein the webpage includes one or more categories available to be selected by the user, the one or more categories configured to facilitate input of the RFE information.

6. The computer-assisted method of claim 3, wherein the webpage includes a plaintext field configured to accept a textual composition from the user.

7. The computer-assisted method of claim 1, further comprising storing in a storage medium, by the second processor, the received the RFE information and the associated identifier.

8. The computer-assisted method of claim 7, wherein the memory is a database.

9. The computer-assisted method of claim 1, wherein the identifier further includes user information that associates the RFE information with the user.

10. The computer-assisted method of claim 9, wherein the user information that associates the RFE information with the user includes one or more of user name, user address, user phone number and user email address.

11. The computer-assisted method of claim 1, wherein the one or more inputs for submitting the RFE information includes an online form having one or more fields for entering data.

12. The computer-assisted method of claim 11, wherein the one or more fields are associated with prompts configured to instruct the user about the data to be entered into the one or more fields.

13. A tangible, non-transitory, computer readable medium for storing computer executable instructions for handling a request for enhancement (RFE), with the computer executable instructions for:
    receiving RFE information submitted from a remote user, the RFE information being tagged, by a processor, with an identifier associating the RFE information with a particular product, the receiving storing the tagged RFE information in memory structured to enable centralized access;
    processing, including providing feedback information, by multiple departments associated with the particular product concerning evaluation of the tagged RFE information, centrally storing the feedback information in the structured memory;
    responsively sending evaluation status of the RFE information to the remote user, the sending including periodically providing status communications to the user, the sending triggered by at least one of (i) time intervals and (ii) events based upon RFE processing, the evaluation status being generated by monitoring the evaluation process across the multiple departments to determine any processing by any of the multiple departments concerning evaluation of the RFE information.

14. The tangible, non-transitory, computer readable medium of claim 13, further comprising instructions for storing in a storage medium the RFE information and the associated identifier.

15. The tangible, non-transitory, computer readable medium of claim 14, wherein the memory is a database.

16. A tangible, non-transitory, computer readable medium for storing computer executable instructions for submitting a request for enhancement (RFE), with the computer executable instructions for:
    providing, in a particular product, a graphical user interface (GUI) configured to present to the user one or more inputs for submitting RFE information, the inputs being specific to the particular product;
    conveying, by a first processor associated with the product, the RFE information the user submits to the one or more inputs, the RFE information being tagged, by the first processor, with an identifier associating the RFE information with the product, and the tagged RFE information being stored in memory structured to enable centralized access;
    processing, including providing feedback information, by multiple departments associated with the particular product concerning evaluation of the tagged RFE information, centrally storing the feedback information in the structured memory;
    responsively receiving, by the first processor, evaluation status of the tagged RFE information as accessed through the stored memory, the receiving including periodically obtaining status communications from the user, the receiving triggered by at least one of (i) time intervals and (ii) events based upon RFE processing, the evaluation status being generated by monitoring the evaluation process across the multiple departments to determine any processing by any of the multiple departments concerning evaluation of the RFE information.

17. The tangible, non-transitory, computer readable medium of claim 16, further comprising instructions for presenting a link to the user that when selected directs the user to a webpage configured to provide the one or more inputs for the submitting of the RFE information.

18. The tangible, non-transitory, computer readable medium of claim 17, further comprising instructions for providing one or more categories available to be selected by the user, the one or more categories configured to facilitate input of the RFE information.

* * * * *